Feb. 26, 1963 J. ARVAN 3,078,786
AUTOMATIC DEEP FAT FRYER
Filed June 7, 1960 3 Sheets-Sheet 1

INVENTOR.
John Arvan
BY
Irving Seidman
ATTORNEY

Feb. 26, 1963  J. ARVAN  3,078,786
AUTOMATIC DEEP FAT FRYER
Filed June 7, 1960  3 Sheets-Sheet 2

INVENTOR.
John Arvan
BY
*Irving Seidman*
ATTORNEY

Feb. 26, 1963  J. ARVAN  3,078,786
AUTOMATIC DEEP FAT FRYER
Filed June 7, 1960  3 Sheets-Sheet 3

INVENTOR.
John Arvan
BY
ATTORNEY

United States Patent Office 3,078,786
Patented Feb. 26, 1963

3,078,786
AUTOMATIC DEEP FAT FRYER
John Arvan, Port Chester, N.Y., assignor to Luk-O-Ma Corporation, a corporation of New York
Filed June 7, 1960, Ser. No. 34,508
2 Claims. (Cl. 99—407)

This invention relates to deep fat friers and, more particularly, to a novel and relatively simple automatically controlled deep fat frier.

In the normal use of a deep fat frier, the food to be fried is placed in a perforated holder or basket and dipped into the hot liquid cooking fat. If the food item is one which is lighter than the cooking oil or fat, it will rise to the surface of the oil, so that some means must be used to hold such a food item submerged for thorough cooking thereof. Also, considerable care must be used to avoid splashing or spattering of the hot oil when placing food items in the frier or removing them therefrom. All of these requirements have posed substantial difficulties preventing development of simple and relatively inexpensive automation equipment for deep fat friers.

In accordance with the present invention, automation mechanism of a relatively simple and inexpensive nature is provided for a deep fat fried by mounting the perforated basket on a vertically reciprocable plunger normally biased to an upper position lifting the basket from the cooking oil. A cover is hinged to the basket and, by means of a novel combination of linkage and differential springs, this cover is made to close gently, as the basket is lowered into the oil, and to open gently as the basket is lifted from the oil. Furthermore, the cover is quickly and easily removable.

The plunger is depressed by swinging an operating lever and, as it reaches its lower limit of movement, it closes a switch energizing a timer and also a solenoid operating a latch for the plunger. At the end of the pre-settable timer cycle, the solenoid releases the latch and the plunger moves upwardly. The plunger movement is under the control of a hydraulic assembly having an action resembling that of a shock absorber in that it permits relatively free depression of the plunger while restricting the rate at which the plunger is raised by its biasing spring.

For an understanding of the invention principles, reference is made to the following description of a typical embodiment thereof as illustrated in the accompanying drawing. In the drawing.

Figure 1:
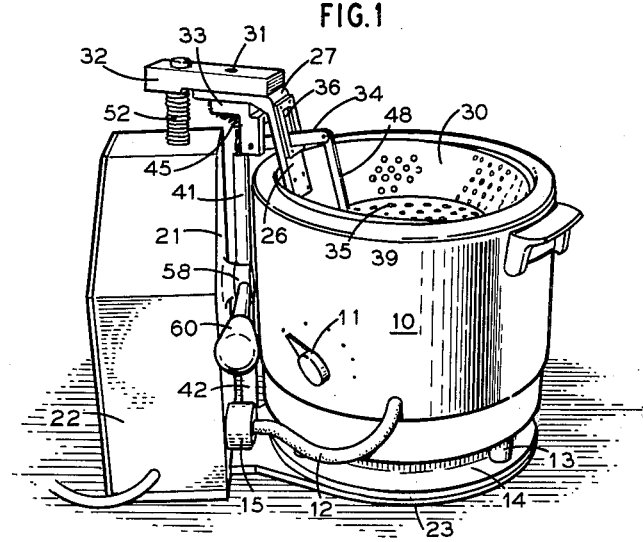
FIGS. 1 and 2 are perspective views of a deep fat frier embodying the invention, showing the basket and its cover closed and lowered, and raised and open, respectively.

Referring to FIGS. 1, 2, 4 and 7, the apparatus includes a deep fat frier 10 which may be a commercial frier of any known make or construction. Frier or tank 10 is electrically heated by suitable heating coils (not shown) in its base and with the temperature controlled by a suitable thermostat selector switch 11. Electric power is supplied by a cord 12 connected to a receptacle 15 on a wall 21 of the housing 22 of the automatic control mechanism.

For the purposes of the invention, tank 10 has its legs 13 secured to a circular plate 14 provided with a pair of keyhole apertures 16. These apertures receive headed studs 17 and 18 on a base plate 23 extending from wall 21 of housing 22. One stud 17 is longer than the other stud 18 and, adjacent the aperture or slot 16 for stud 21 a latch 25, having a recess 24, is pivoted to plate 14. When studs 17, 18 are engaged in slots 16, plate 14 is moved so that the studs enter the narrow portions of the slots. Latch 25 is then swung beneath the head of stud 17 to lock tank 10 in fixed predetermined relation to its control mechanism. By swinging latch 25 out of the way, the tank may be disengaged from plate 23 for cleaning or replacement, the tank being lifted by handles 19. Before this, however, the perforated basket is readily disconnected from the control mechanism in a manner to be described. It should be noted that tank 10 is preferably of stainless steel for assurance of cleanliness in cooking.

The automatic control mechanism, generally indicated at 20, is mounted in or on housing 22 and its extended base plate 23. This mechanism controls raising and lowering of perforated basket 30 and its perforated hinged cover 35 relative to tank 10. For long wear and easy and thorough cleanability, basket 30 and cover 35 are preferably formed of stainless steel.

Figure 2:
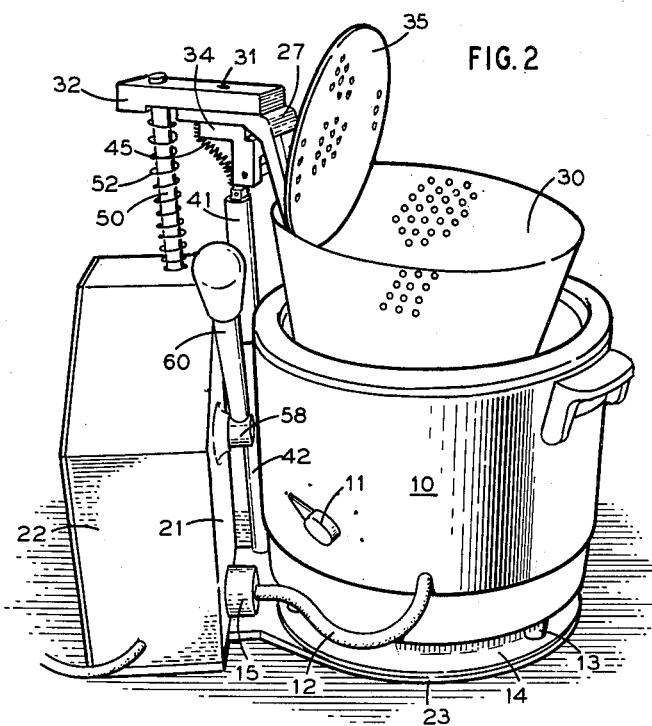
Figure 4:
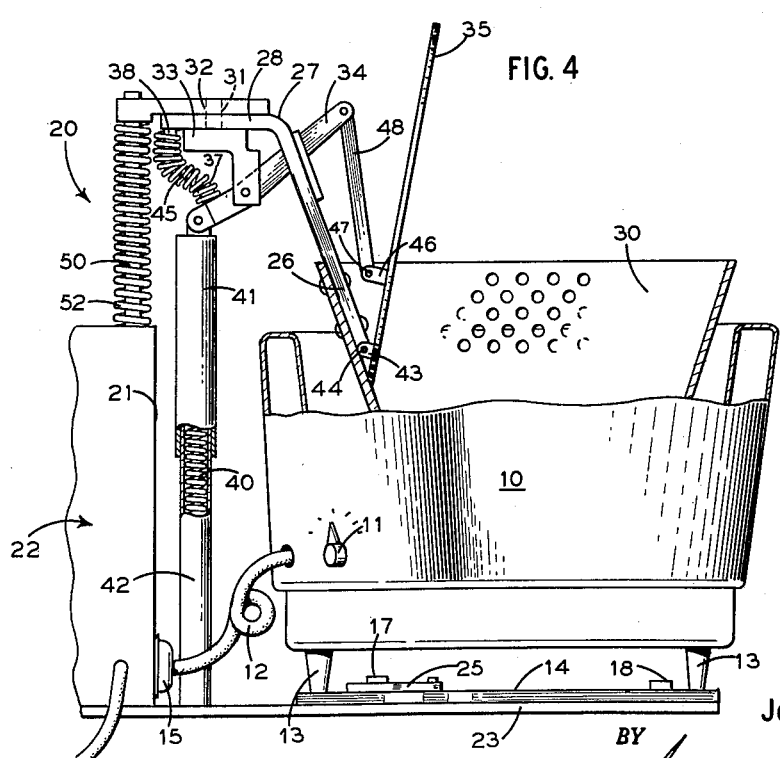
FIG. 4 is an enlarged elevation view, partly in section, illustrating the basket, its cover, and the automatic cover operating means.

Referring to FIGS. 1, 2 and 4, basket 30 is connected to the longer arm 26 of a bent strap 27 having a shorter arm 28 secured by a flush stud 31 to a bar 32 of heat insulating material, such as a suitable synthetic resin. Arm 28 has a dependent bracket 33 secured thereto and pivotally supporting a lever 34 extending through an edge reinforced slot 36 in arm 26 of strap 27.

The inner end of lever 34 is pivotally connected to the closed upper end of a tubular sleeve 41 telescoped over a second tubular sleeve 42 secured to base 23. Sleeves 41, 42 enclose a compression coil spring 40. A lug 37 adjacent the inner end of lever 34 seats one end of a coil spring 45 whose other end is seated on a lug 38 on the end of arm 28 of strap 27. Spring 40 is stronger than spring 45 to provide a differential action described more fully hereinafter.

A bracket 43 adjacent the periphery of cover 35 is pivotally connected to the end of strap arm 26 by a removable pin 44. A second bracket 46 on cover 35, spaced inwardly from bracket 43, is pivotally connected by a pin 47 to one end of a link 48 having its other end pivotally connected to the outer end of lever 34. By removing pins 44 and 47, cover 35 can be readily detached from basket 30 in the event it is not needed, as in cooking food items which do not float to the surface of the cooking oil, and also for cleaning.

Figure 3:
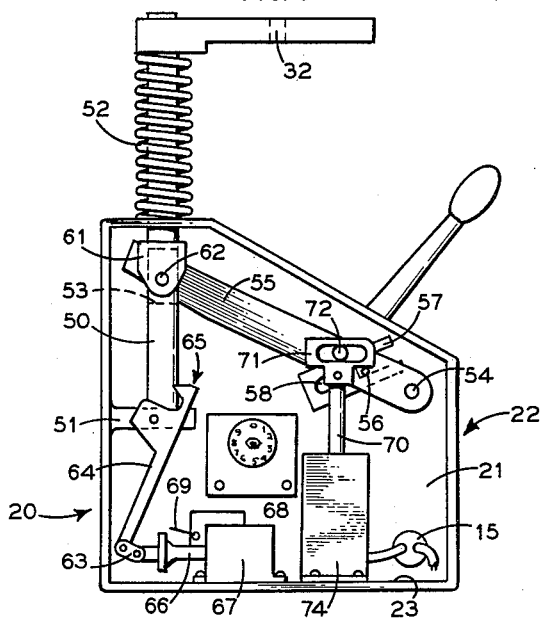
FIG. 3 is an elevation view, with a cover plate removed, illustrating the automatic operating and control mechanism.

As best seen in FIGS. 3 and 4, bar 32 is secured to extend from the upper end of a vertically reciprocable plunger or rod 50 extending through the top wall of housing 22 and through an apertured bracket 51 on an end wall of the housing. A relatively heavy coil spring 52 normally biases rod 50 to its upper limiting position lifting basket 30 out of the oil in tank 10. Rod 50 has a slot 53 through which extends the end of a lever 55 pivoted at 54 to wall 21. Near its pivoted end, lever 55 carries a bearing 56 engaged in a fork 57 secured on a stub shaft 58 mounted in wall 21. An operating handle 60 is secured to the outer end of stub shaft 58.

A bracket 61 on rod 50 carries a pin 62 cooperable with a latch 65 pivoted on bracket 51. A link 63 connects the free end of arm 64 of bracket 65 to the plunger 66 of a solenoid 67 on base 23. Adjacent this solenoid is a micro-switch 68 having an operator 69 projecting into the path of movement of rod 50.

Figure 5:
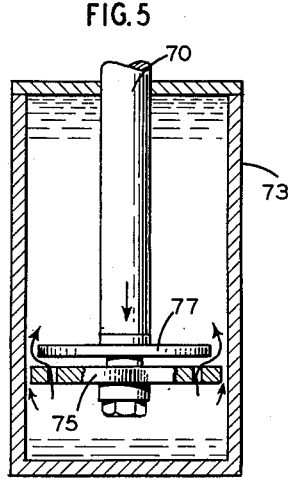
FIGS. 5 and 6 are axial sectional views of means controlling the speed of raising the basket.
Figure 6:
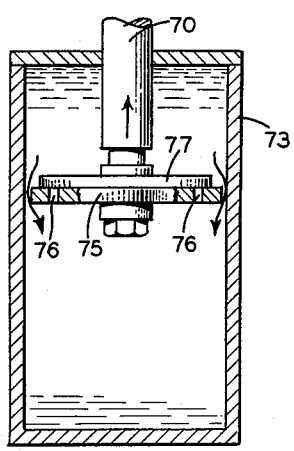
Figure 7:
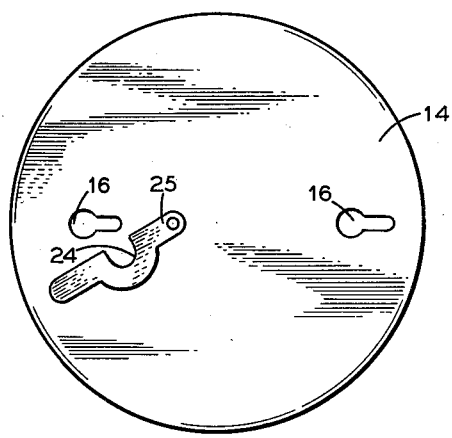
FIG. 7 is a plan view of the base of the frier.

Referring to FIGS. 3, 5 and 6, the speed checking mechanism for retarding lifting of basket 30 comprises a piston rod 70 having a slotted head 71 on its outer end engaged with a pin 72 on lever 55. The other end of rod 70 extends into a closed cylinder 73 encased in a housing 74 on base 23. A perforated piston 75 is secured to the reduced inner end of rod 70 and has a very small peripheral clearance with cylinder 73. Piston 75 has a series of openings 76 arranged to be blocked by an imperforate plate 77. Plate 77 has a limited sliding motion on rod 70 above piston 75.

The interior of cylinder 73 is substantially filled with hydraulic fluid. When rod 70 descends (FIG. 5), plate 77 lifts and fluid flows freely through apertures 76 and in a restricted manner around piston 75. Thus, rod 70 can move down freely. However, when rod 70 ascends (FIG. 6), plate 77 blocks apertures 76 and all the fluid must flow in the restricted clearance around piston 75. This greatly retards the rate of upward movement of rod 70.

The apparatus operates as follows: When the control switch for frier 10 is closed, the oil therein is heated to the temperature set by control 11. The food items are placed in the normally raised basket 30, and operating handle 60 is swung down (clockwise as shown in FIG. 3). Through fork 57 and bearing 56, lever 55 is swung down, in turn forcing plunger 50 down against the force of spring 52. As plunger 50 reaches its lower limit of movement, it strikes operator 69 of normally open microswitch 68.

Figure 8:
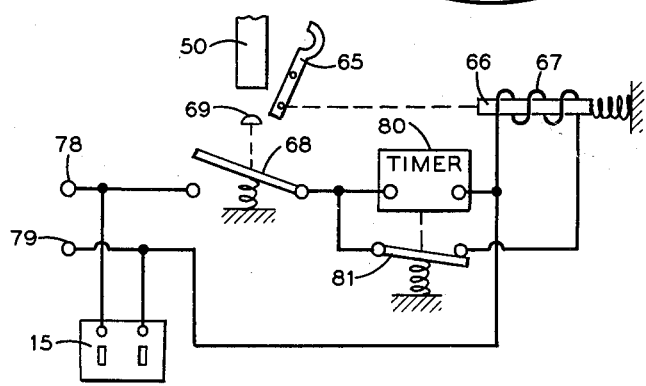
FIG. 8 is a schematic wiring diagram of the automatic control means.

As best seen in FIG. 8, switch 68 is connected in series between one supply terminal 78 and one terminal of timer 80. The other terminal of timer 80 is connected to the other supply terminal 79. Switch 68 is also connected in a series circuit including terminal 78, switch 68, a normally closed timer operated micro-switch 81, a solenoid 67, and terminal 79. Thus, when switch 68 is closed, solenoid 67 and timer 80 are energized.

Energization of solenoid 67 causes its plunger 66 to retract and engage latch 65 with pin 62, thus locking plunger 50 in the down position with basket 30 immersed in the hot cooking oil. During this downward movement of plunger 50, the speed checking mechanism offers no resistance.

As basket 30 is lowered, spring 40 is compressed. After a short movement of basket 30, the increased compression of spring 40 overcomes the force of spring 45 and lever 34 is swung clockwise to close cover 35.

At the end of the time setting of timer 80, 2.5 minutes for example, the timer opens switch 81 breaking the energizing circuits for the timer and solenoid 67. Latch 65 is released, and spring 52 moves plunger 50 upwardly. During this movement, the speed check is operative on lever 55 through piston rod 70, and thus the raising of plunger 70 is retarded. This braking action in raising basket 30 avoids splashing of the hot oil.

As basket 30 is raised, spring 40 expands and just before the upper limit of movement, the force of spring 45 overbalances that of spring 40. Lever 34 is swung counterclockwise to open cover 35. The cooked food items may then be removed from basket 30.

All the parts are rugged, and those parts in contact with the food or oil are easily removed for cleaning. Bar 32 prevents conduction of heat from frier 10 to the mechanism 20.

While a specific embodiment of the invention has been shown and described in detail to illustrate the application of the invention principles, it will be understood that the invention may be embodied otherwise without departing from such principles.

What is claimed is:

1. Deep fat frying apparatus comprising, in combination, an electrically heated deep fat frying tank; a support structure for said tank; a support mounted on said structure adjacent said tank for vertical movement relative to said tank; a perforated basket secured to said support and movable into the cooking oil in said tank, when said support moves downwardly, and lifting from the cooking oil, when said support moves upwardly; biasing means urging said support to its upper position; releasable latch means operable, responsive to downward movement of said support, to latch the latter in its lower position; a perforated cover for said basket, hinged to said support: and cover operating means, including a lever pivotally connected intermediate its ends to said support, a link pivotally interconnected between one end of lever and said cover, and differential spring means operatively interposed between the other end of said lever and said support and said structure; said cover operating means being effective, upon lowering of said basket, to close said cover and, upon raising of said basket to open said cover at a point just in advance of the upper limiting position of said basket.

2. Apparatus as claimed in claim 1 in which said differential spring means includes a telescoping housing extending between said structure and the extremity of the other end of said lever; a first compression coil spring in said housing; and a second compression coil spring connected between said support and said lever in adjacent spaced relation to such extremity.

References Cited in the file of this patent

UNITED STATES PATENTS

| | | |
|---|---|---|
| 1,377,984 | Lamb | May 10, 1921 |
| 2,244,145 | Erickson | June 3, 1941 |
| 2,558,077 | Fitzgerald | June 26, 1951 |
| 2,568,792 | Cripps | Sept. 25, 1951 |
| 2,630,062 | Litt | Mar. 3, 1953 |
| 2,674,938 | Tagliaferri et al. | Apr. 13, 1954 |
| 2,915,000 | Hetzel et al. | Dec. 1, 1959 |